United States Patent
Kutsch

[11] Patent Number: 6,146,167
[45] Date of Patent: Nov. 14, 2000

[54] TELECOMMUNICATION MODULE HAVING EDGE MOUNTED JACK AND SWITCH THEREFOR

[75] Inventor: Duane B. Kutsch, Seattle, Wash.

[73] Assignee: Telect, Inc., Liberty Lake, Wash.

[21] Appl. No.: 09/277,235

[22] Filed: Mar. 26, 1999

Related U.S. Application Data

[60] Provisional application No. 60/100,604, Sep. 16, 1998.

[51] Int. Cl.[7] .................................................. H01R 29/00
[52] U.S. Cl. ............................................ 439/188; 439/944
[58] Field of Search ..................................... 439/188, 944; 200/51.11, 51.12, 51.13, 51.14

[56] References Cited

U.S. PATENT DOCUMENTS

| | | | |
|---|---|---|---|
| 4,002,399 | 1/1977 | Deitch et al. ........................... | 339/221 |
| 4,017,770 | 4/1977 | Valfre ..................................... | 361/399 |
| 4,213,013 | 7/1980 | Perna et al. ............................ | 179/98 |
| 4,221,445 | 9/1980 | Fleischhacker et al. ............... | 339/18 R |
| 4,273,966 | 6/1981 | Briggs, Jr. et al. .................... | 179/98 |
| 4,286,121 | 8/1981 | Olszewski et al. .................... | 179/98 |
| 4,312,552 | 1/1982 | Hughes et al. ......................... | 339/36 |
| 4,423,466 | 12/1983 | Beaun .................................... | 361/400 |
| 4,426,558 | 1/1984 | Takana et al. ......................... | 200/51.09 |
| 4,514,030 | 4/1985 | Triner et al. ........................... | 339/176 |
| 4,595,799 | 6/1986 | Krob et al. ............................. | 179/98 |
| 4,609,242 | 9/1986 | Kemppainen .......................... | 339/17 |
| 4,618,194 | 10/1986 | Kwilos ................................... | 339/14 R |
| 4,628,159 | 12/1986 | Deitch et al. .......................... | 200/51.05 |
| 4,633,048 | 12/1986 | Komatsu ................................ | 200/51.1 |
| 4,705,921 | 11/1987 | Rabey et al. ........................... | 200/50 |
| 4,737,985 | 4/1988 | DeLuca et al. ........................ | 379/327 |
| 4,749,968 | 6/1988 | Burroughs .............................. | 333/105 |
| 4,770,639 | 9/1988 | Lau ........................................ | 439/61 |
| 4,773,867 | 9/1988 | Keller et al. ........................... | 439/49 |
| 4,796,289 | 1/1989 | Masor .................................... | 379/26 |
| 4,797,114 | 1/1989 | Lau ........................................ | 439/79 |
| 4,811,169 | 3/1989 | DeLuca et al. ........................ | 361/429 |
| 4,815,104 | 3/1989 | Williams et al. ...................... | 375/36 |
| 4,820,200 | 4/1989 | Lau ........................................ | 439/607 |
| 4,861,281 | 8/1989 | Warner .................................. | 439/540 |
| 4,874,317 | 10/1989 | Lau ........................................ | 439/54 |
| 4,941,165 | 7/1990 | Rademacher et al. ................. | 379/1 |
| 4,975,087 | 12/1990 | Williams et al. ...................... | 439/668 |
| 5,078,624 | 1/1992 | Burroughs et al. .................... | 439/668 |
| 5,178,554 | 1/1993 | Siemon et al. ........................ | 439/188 |
| 5,178,558 | 1/1993 | Knox et al. ............................ | 439/404 |
| 5,209,678 | 5/1993 | Allen et al. ............................ | 439/672 |
| 5,214,673 | 5/1993 | Morgenstern et al. ................ | 375/36 |
| 5,233,501 | 8/1993 | Allen et al. ............................ | 361/733 |
| 5,265,156 | 11/1993 | Eason et al. ........................... | 379/327 |
| 5,272,277 | 12/1993 | Humbles et al. ...................... | 174/48 |
| 5,281,163 | 1/1994 | Knox et al. ............................ | 439/404 |
| 5,393,249 | 2/1995 | Morgenstern et al. ................ | 439/668 |
| 5,432,847 | 7/1995 | Hill et al. .............................. | 379/328 |
| 5,439,395 | 8/1995 | Laukzemis ............................ | 439/668 |

(List continued on next page.)

FOREIGN PATENT DOCUMENTS

| | | | |
|---|---|---|---|
| 0 364 658 | 4/1988 | European Pat. Off. ................ | 1/14 |
| 0 243 296 | 12/1990 | European Pat. Off. ................ | 1/14 |
| 1582238 | 7/1990 | U.S.S.R. ................................ | 13/70 |
| 2 111 770 | 7/1983 | United Kingdom ................... | 13/703 |

*Primary Examiner*—Lincoln Donovan
*Assistant Examiner*—Chandrika Prasad
*Attorney, Agent, or Firm*—Wells, St. John, Roberts, Gregory & Matkin, P.S.; G. Andrew Barger

[57] ABSTRACT

A telecommunication module that has a circuit board disposed therein with a bounding edge. The module includes a jack coupled to the edge of the circuit board for receiving a plug therein with an active state and an inactive state. A switch is mounted on the circuit board and a switch operation shaft is mechanically and electrically coupled to the switch and extending outward therefrom such that the switch operation shaft is adjacent to the jack. When the plug is inserted into the jack, the switch operation shaft is rotated thereby changing states of the switch. An angled ramp is coupled to the switch operation shaft and spaced apart from the switch. The jack further includes an opening disposed therein for receiving the angled ramp therein. Moreover, when the plug is inserted into the jack, the plug contacts the angled ramp within the jack causing the switch operation shaft to rotate, thereby changing states of the switch as the angled ramp is biased from within the jack.

30 Claims, 9 Drawing Sheets

U.S. PATENT DOCUMENTS

| | | | |
|---|---|---|---|
| 5,456,608 | 10/1995 | Rogers et al. | 439/48 |
| 5,466,167 | 11/1995 | Scherer | 439/188 |
| 5,467,062 | 11/1995 | Burroughs | 333/124 |
| 5,482,469 | 1/1996 | Seiceanu et al. | 439/188 |
| 5,522,738 | 6/1996 | Lace | 439/669 |
| 5,546,282 | 8/1996 | Hill et al. | 361/796 |
| 5,552,962 | 9/1996 | Feustel et al. | 361/733 |
| 5,588,869 | 12/1996 | Jensen et al. | 439/417 |
| 5,639,261 | 6/1997 | Rutkowski et al. | 439/534 |
| 5,669,779 | 9/1997 | Galloway et al. | 439/188 |
| 5,685,741 | 11/1997 | Dewey et al. | 439/668 |
| 5,701,380 | 12/1997 | Larson et al. | 385/134 |
| 5,734,306 | 3/1998 | Jantunen et al. | 333/206 |
| 5,879,197 | 3/1999 | Dewey | 439/668 |
| 5,882,217 | 3/1999 | Aponte et al. | 439/188 |
| 5,903,829 | 5/1999 | Anderson et al. | 455/347 |
| 5,909,155 | 6/1999 | Anderson et al. | 333/100 |
| 5,913,701 | 6/1999 | Olson et al. | 439/668 |
| 5,938,478 | 8/1999 | Werner | 439/668 |

TELECOMMUNICATION MODULE HAVING EDGE MOUNTED JACK AND SWITCH THEREFOR

RELATED REFERENCES

This application claims priority of Provisional Patent Application No. 60/100,604 filed Sep. 16, 1998, and entitled: "Telecommunication Switch for a Jack."

FIELD OF THE INVENTION

In general, the present invention relates to telecommunication switches and, in particular, the present invention relates to a telecommunication module such as a Digital Signal Cross Connect (DSX) module that has a jack mounted to an edge of a Printed Circuit Board (PCB) and a switch therefor.

BACKGROUND

Telecommunication modules, such as DSX modules, are used as interfaces for cross connecting an electrical signal from one telecommunications device or network to another. In current designs each jack, which is typically a WECO or BNC jack, of a DSX module is coupled to, and mounted on top of, a switch, which in turn is mounted on a PCB. This creates a thick housing for the module that encases the jacks, switches, and at least part of the PCB of the module. Thus, current jacks are limited by their size, cost, and adaptability.

Moreover, current jacks have electrical power running through them when the associated DSX module is coupled to a backplane because switches contained within the module are normally open. Therefore, electrocution can occur if a conductive object, such as a pen or paperclip, is inserted into the jack. The jacks of present DSX modules are "live" without a plug inserted into the jacks.

SUMMARY OF THE INVENTION

The present invention eliminates the above difficulties and disadvantages by providing a telecommunication module that has a circuit board disposed therein with a bounding edge. The module includes a jack coupled to the edge of the circuit board for receiving a plug therein. A switch is mounted on the circuit board and a switch operation shaft is mechanically and electrically coupled to the switch and extends outward therefrom such that the switch operation shaft is adjacent to the jack. When the plug is inserted into the jack, the switch operation shaft is rotated thereby changing states of the jack so that an electrical signal is permitted to flow through the jack. Because the jack is coupled to the edge of the circuit board, the module has a thin profile allowing more modules to be contained in a smaller physical space.

A further advantage of the present telecommunication module is that an angled ramp is coupled to the switch operation shaft and spaced apart from the switch. The jack further includes an opening disposed therein for receiving the angled ramp therein. When the plug is inserted into the jack, the plug contacts the angled ramp within the jack causing the switch operation shaft to rotate, thereby changing states of the switch as the angled ramp is biased from within the jack.

Another advantage is that a camshaft is coupled to the switch operation shaft and is in axial alignment therewith for rotating when the switch operation shaft is rotated to change states of the switch. Each output and input jack, however, preferably has two spaced apart openings for receiving the angled ramp therein such that the switch and the associated switch operation shaft can be mounted on either side of the jack on the circuit board. The switch further includes a plurality of leaf springs mounted thereon and a corresponding plurality of L-shaped members against which the plurality of leaf springs are naturally biased.

In one embodiment, the camshaft includes a plurality of extensions for each releasing mechanical contact with one of the plurality of leaf springs thereby causing mechanical and electrical connection to be made between the plurality of L-shaped members and the plurality of leaf springs in axial alignment therewith. In another embodiment, a rocker arm performs the function of the camshaft with extensions.

DETAILED DESCRIPTION OF THE PREFERRED EMBODIMENT(S)

Figure 1:
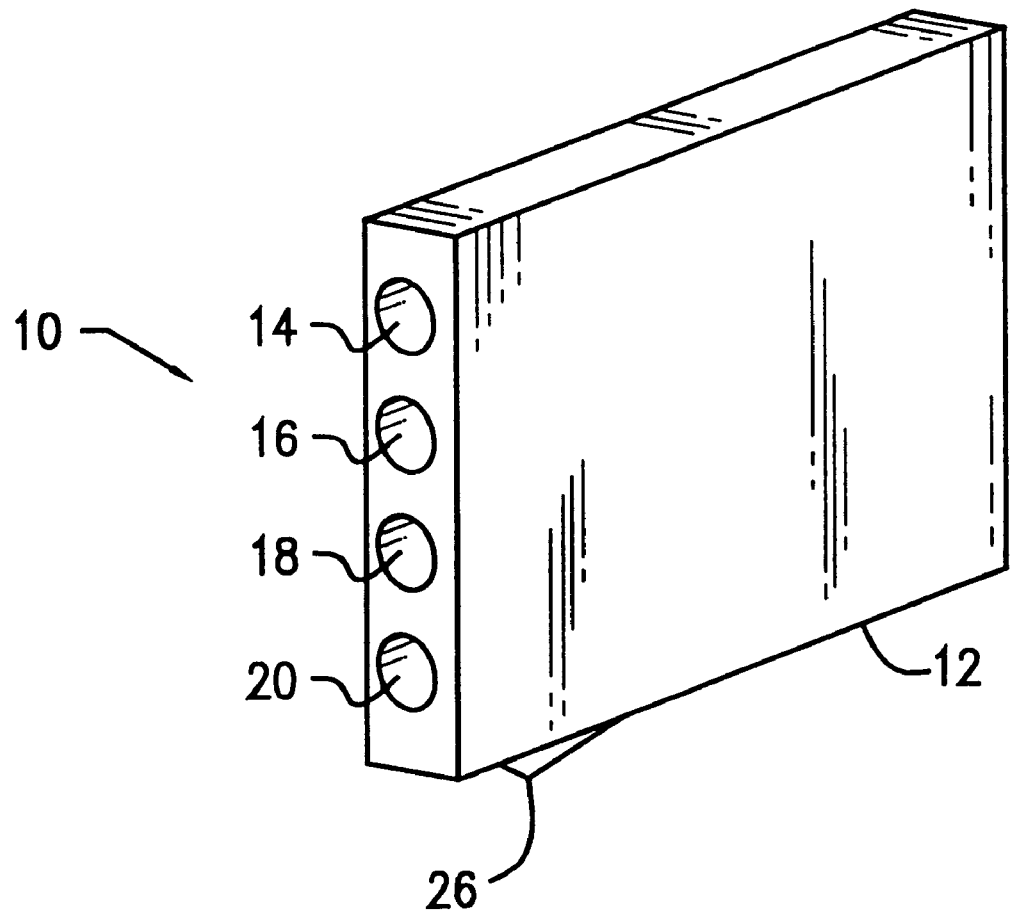
FIG. 1 is a perspective view of a module of the present invention.

The above and other features aspects, and advantages of the present invention will now be discussed in the following detailed description and appended claims, which are to be considered in conjunction with the accompanying drawings in which identical reference characters designate like elements throughout the views. Shown in FIG. 1 is a telecommunication module 10, such as a Digital Signal Cross Connect (DSX) module, which is typically releasably secured within a panel for allowing communication between a piece of telecommunications equipment and a telecommunications network, such as a telephone network. Preferably, the present module 10 receives a DS-3 signal, which is at a high frequency rate on the order of 44.736 megabits per second, but could be a lower frequency signal such as DS-1 on the order of 1.544 megabits per second or higher frequency signal such as a DS-4 on the order of 274.176 megabits per second. The module 10 includes a plastic casing 12 to protect the contents of the module 10. A tab 26 protrudes through the casing 12 for securing the module 10 within the panel.

Figure 3:
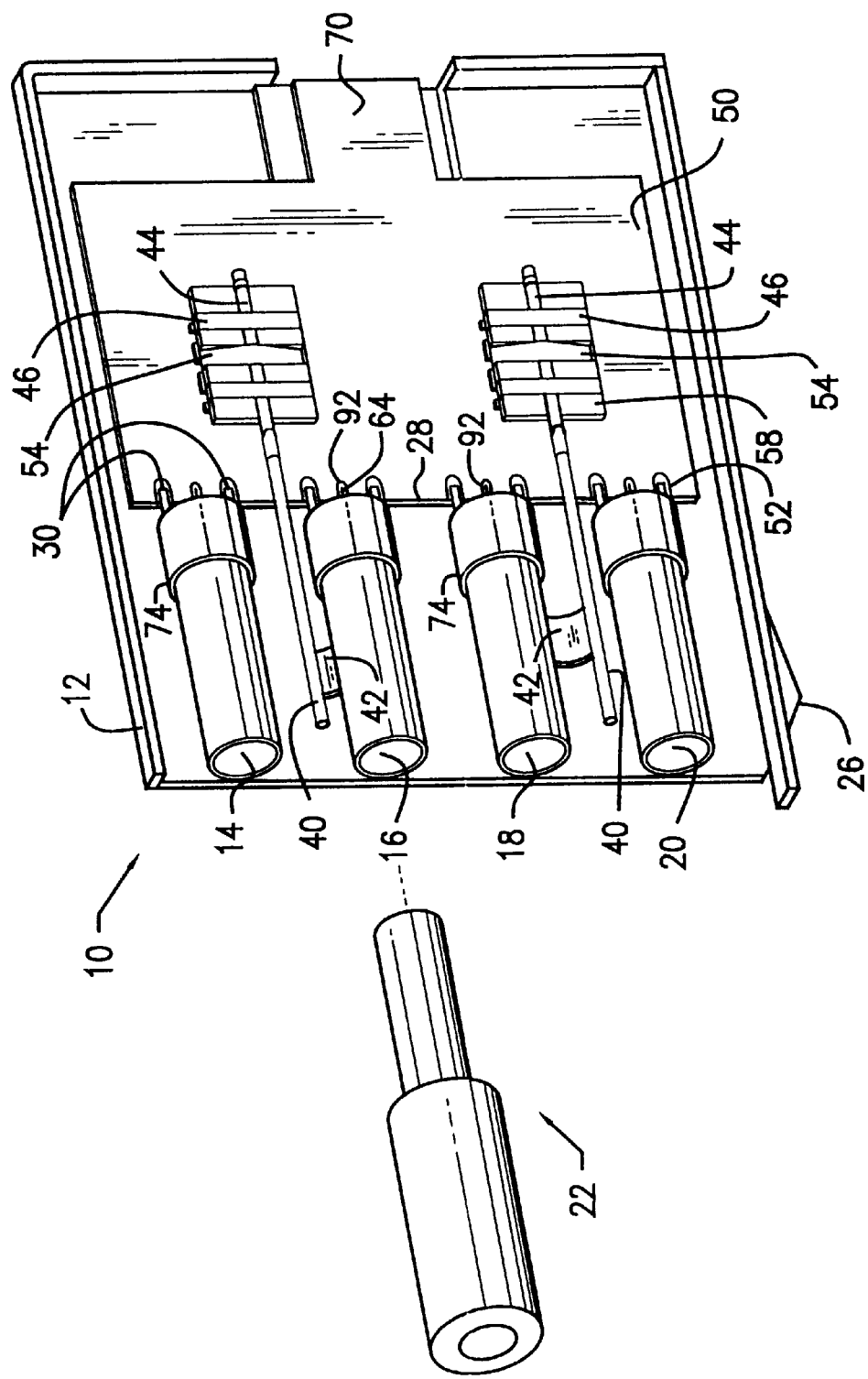
FIG. 3 is a perspective view of the module of the present invention showing the plurality of jacks mounted on the edge of the PCB of the module with a plug being inserted into a jack of the module.

The module 10 has at least one jack such as a BNC for receiving a plug 22 therein, as shown in FIG. 3, but preferably has a plurality of WECO jacks including a first monitor jack 14, an output jack 16, an input jack 18, and a second monitor jack 20. The first monitor jack 14 and the second monitor jack 20 provide for the taking of samples of a signal from the telecommunications network and the output jack 16 and input jack 18 are for receiving the signal from, and inputting a signal to, the telecommunications network, respectively, as will be discussed in greater below.

Figure 2:
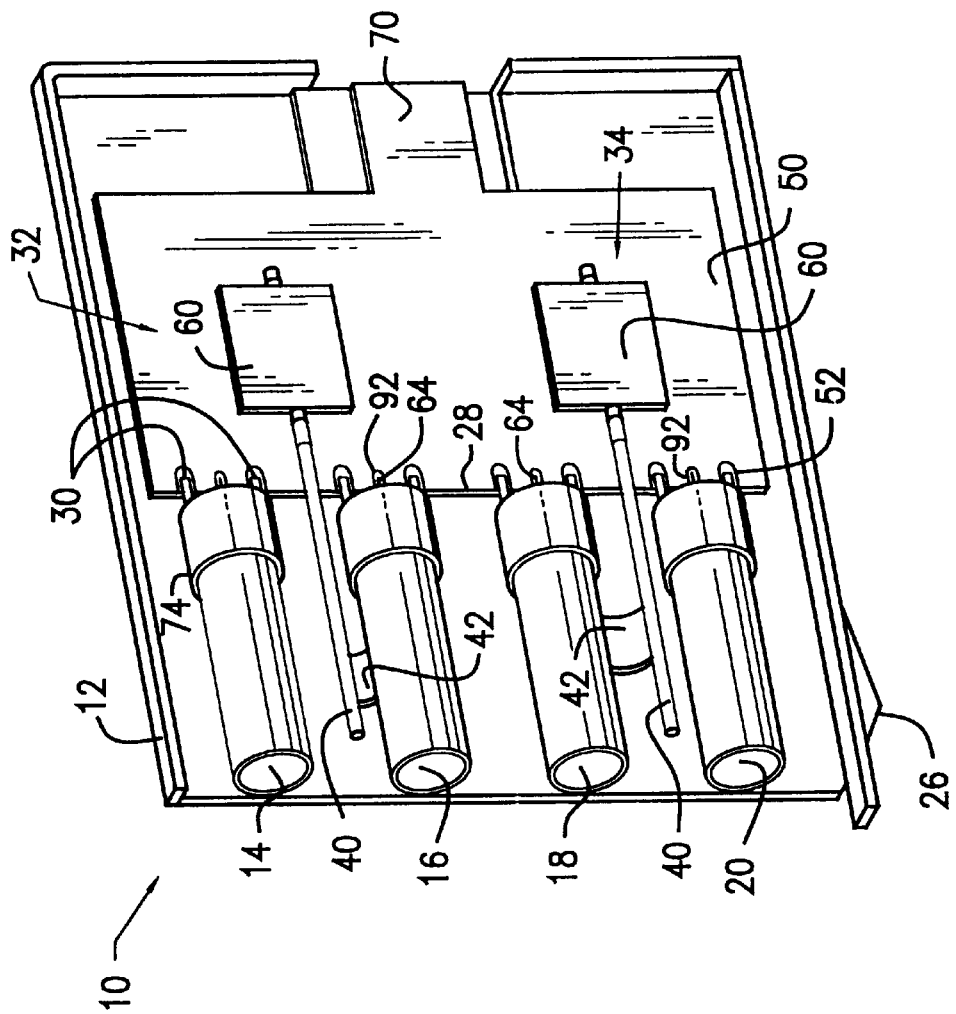
FIG. 2 is a perspective view of the module of the present invention showing a plurality of jacks mounted on an edge of a PCB of the module.
Figure 4:
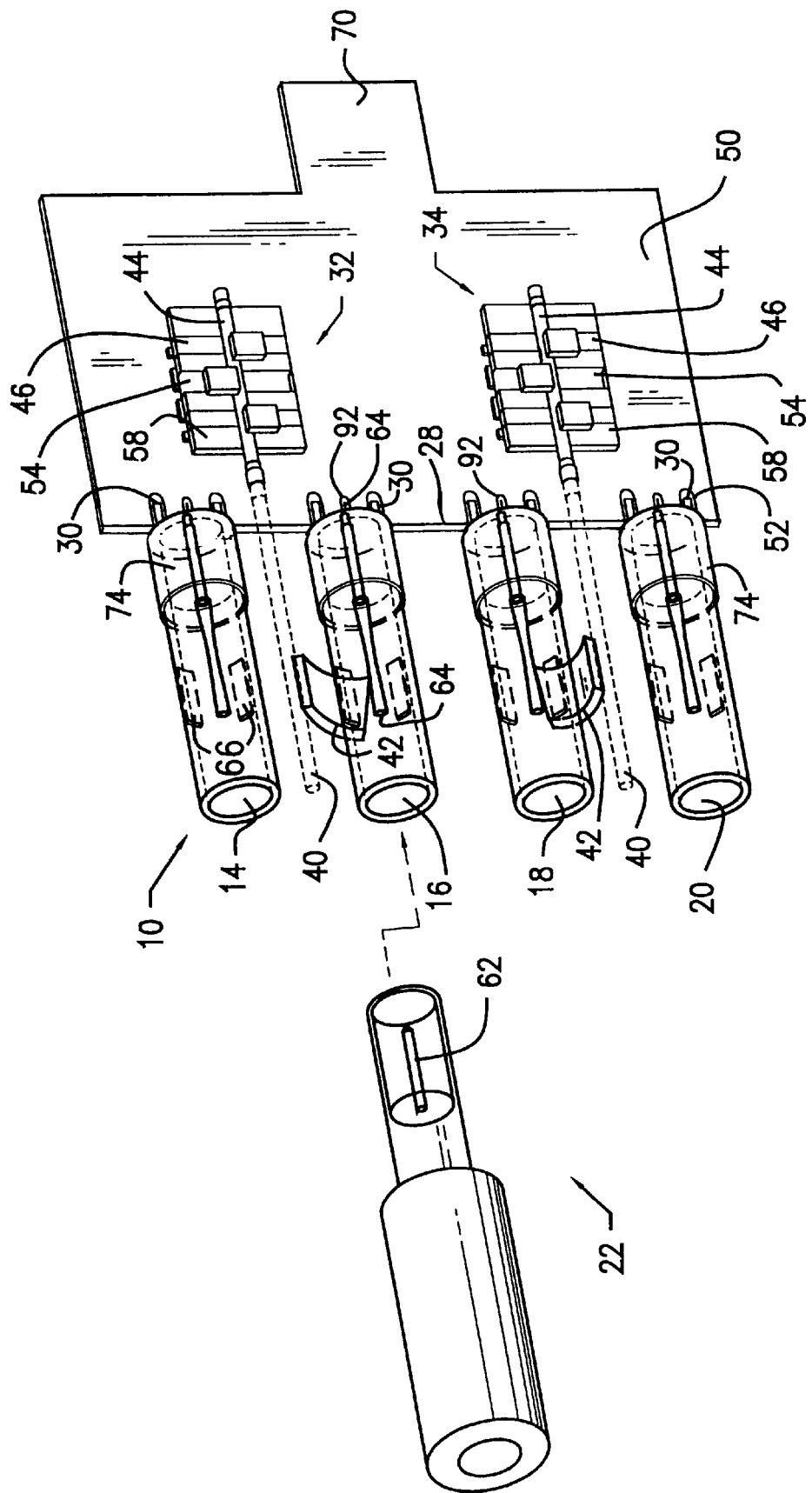
FIG. 4 is a phantom view of the module of the present invention showing the plurality of jacks mounted on the edge of the PCB of the module with a plug being inserted into one of the jacks of the module.
Figure 6:
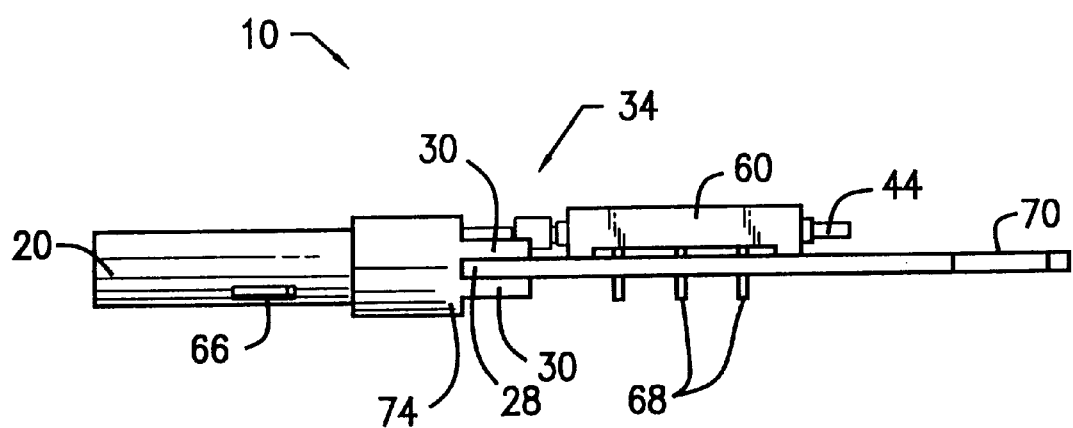
FIG. 6 is a side elevational view of the first embodiment of the switch of the present invention.
Figure 9:
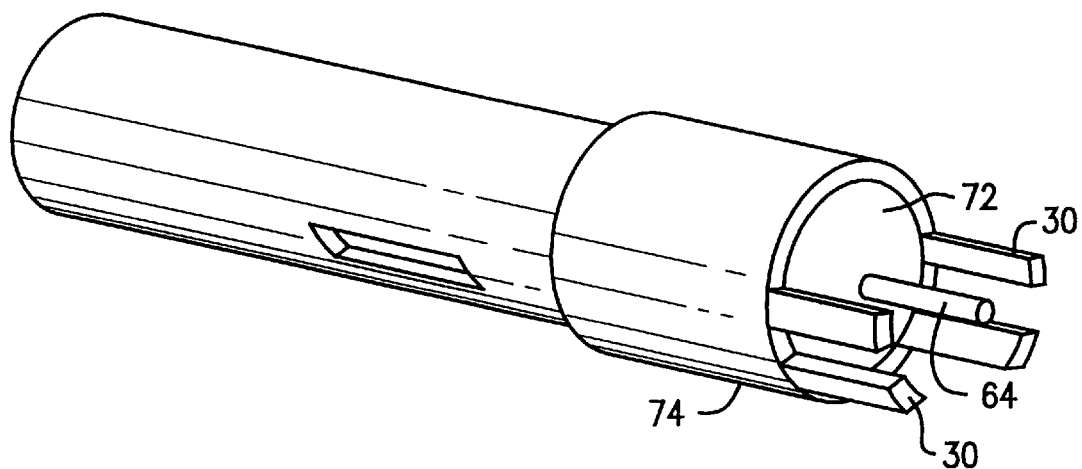
FIG. 9 is a perspective view of one of the edge mountable jacks of the present invention.

As shown in FIGS. 2, 3, 4, and 7, a Printed Circuit Board (PCB) 50 is disposed within the module 10 and has a bounding edge 28 to which the first monitor jack 14, the output jack 16, the input jack 18, and the second monitor jack 20 are coupled for receiving a plug 22 therein. Each of the jacks includes an integral pad 74 as is best shown in FIGS. 6 and 9, which has a plurality of legs 30 extending therefrom for being slidingly received about the circuit board 50 and preferably held in place via friction fit. It is understood, however, that the legs 30 could also be secured to PCB 50 in other ways such as being soldered to the PCB 50 or received within slots in the PCB 50. It is further understood that only one of the legs 30 need be employed on the jack, and it can be attached by being soldered to the PCB 50 or received within a slot via friction fit. The coaxial rod 64 serves to hold the jack to the PCB 50 whether via friction fit, soldering, or being received within a slot. The legs 30 or leg also serve to hold the jack to the PCB 50 whether via friction fit, soldering, or being received within a slot. It is understood, however, that either the coaxial rod 64, the legs 30, or leg can hold the jack to the PCB 50. The legs 30 that are secured to the side of the PCB 50 on which the switches 32 and 34 are mounted, which will be discussed below, contact grounding pads 52, as shown in FIGS. 2, 3, and 4, which ground the PCB 50 to the jack.

The pads 74 are mounted on the bounding edge 28 of the circuit board 50. By mounting the jacks on the edge 28 of the circuit board 50, the overall thickness of the module 10 has been reduced to a minimum thereby allowing a maximum number of modules to be installed in a given physical space. The rod 64 of each of the jacks 14, 16, 18, and 20 projects outside the jacks, as is best shown in FIG. 9, and preferably contacts a landing pad 92 on the PCB 50 and is in electrical and mechanical communication therewith, which is shown in FIGS. 2, 3, and 4. It is also understood, however, that the rod 64 apart from friction contacting the landing pad 92, can also be soldered thereto or received within a port that contains an abutting or encircling landing pad 92. Surrounding each rod 64 is a solid, annular dielectric 72 preferably consisting of Teflon, which is manufactured by the DuPont Company of the United States. The dielectric 72 prevents any electro-magnetic frequencies existing on the rod 64 from transferring to the casing of the jack.

Figure 5:
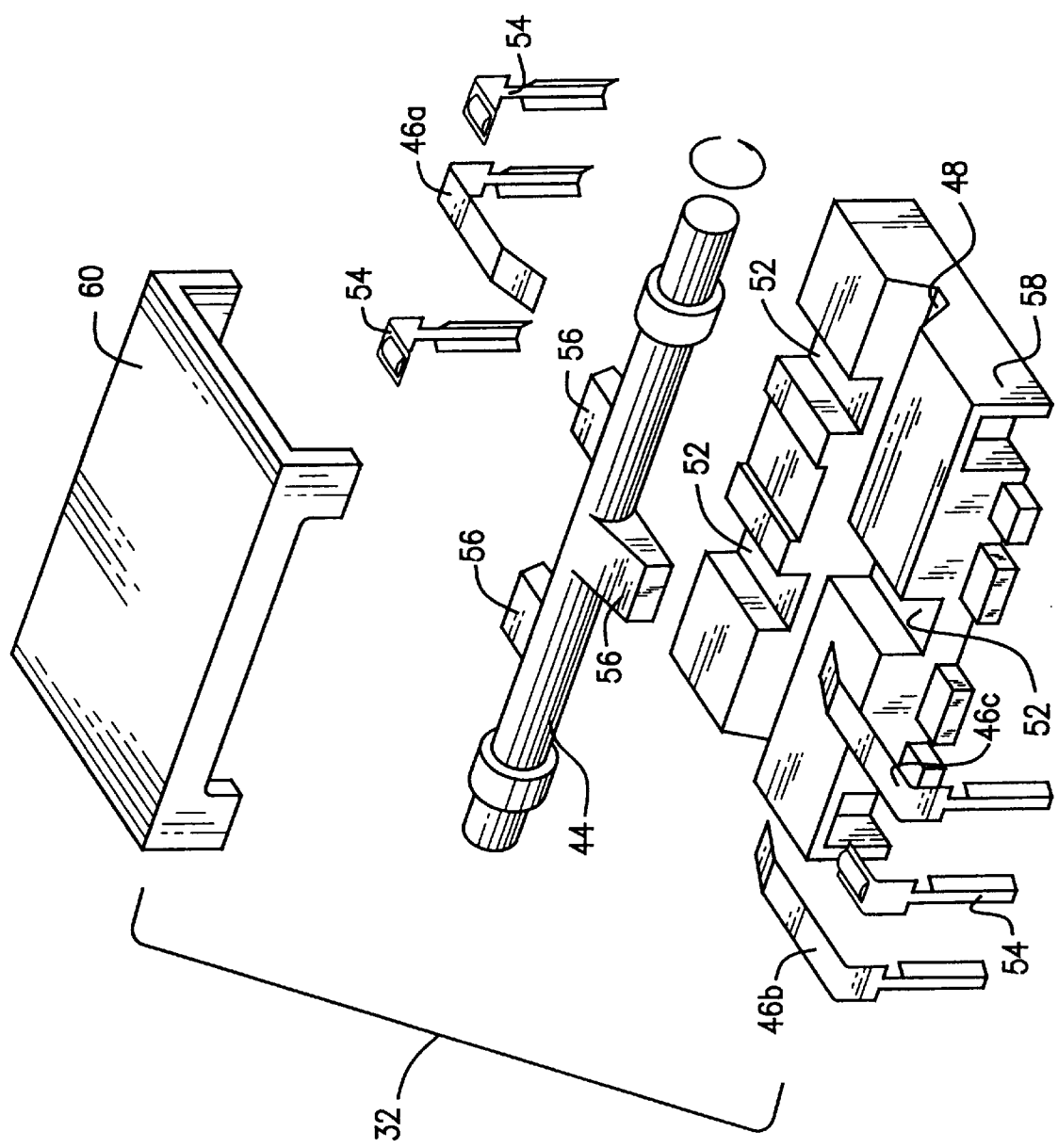
FIG. 5 is an exploded view of a first embodiment of a switch of the present invention.
Figure 7:
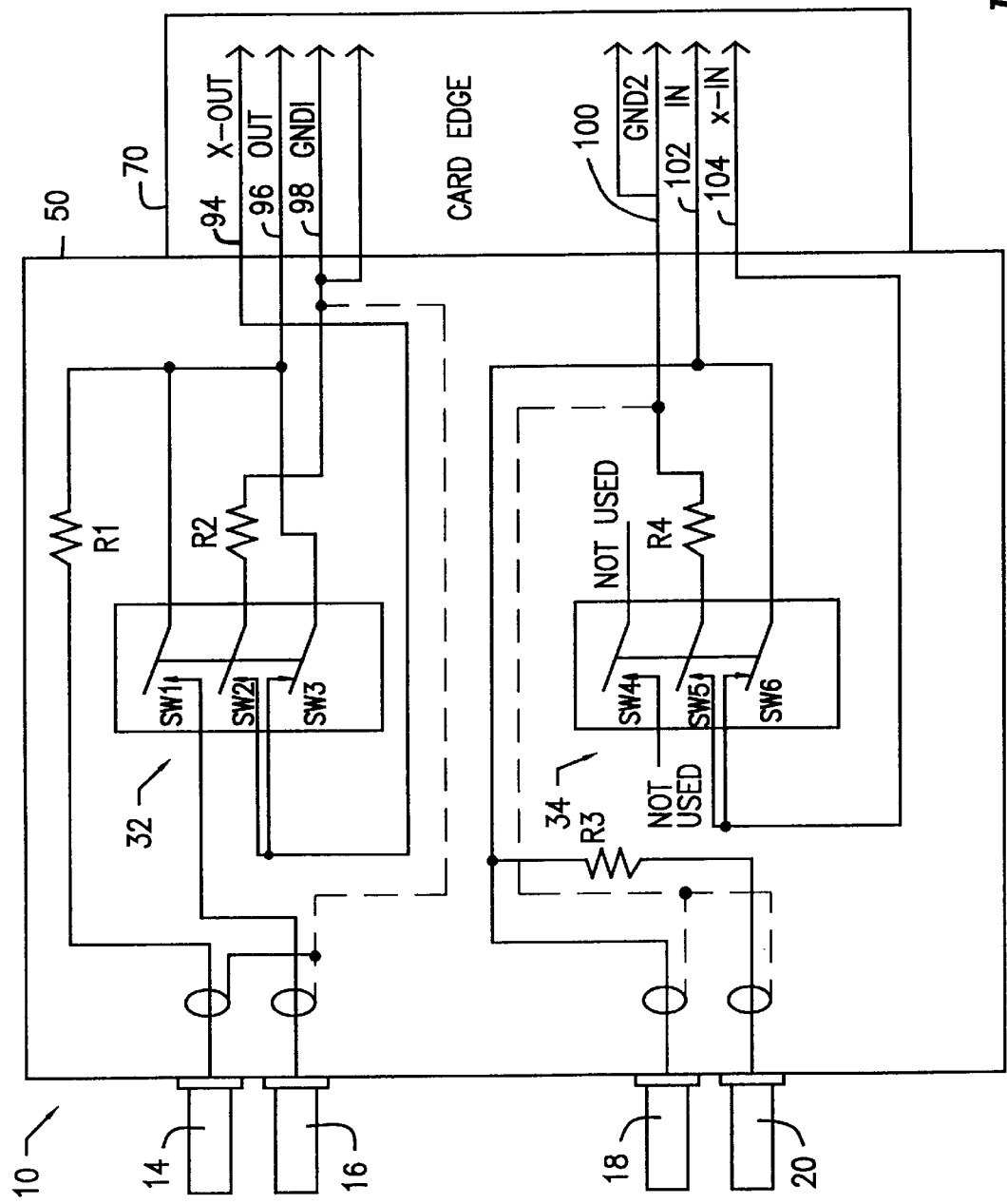
FIG. 7 is a circuit schematic of the circuit board for the first embodiment and a second embodiment module of the present invention.
Figure 8:
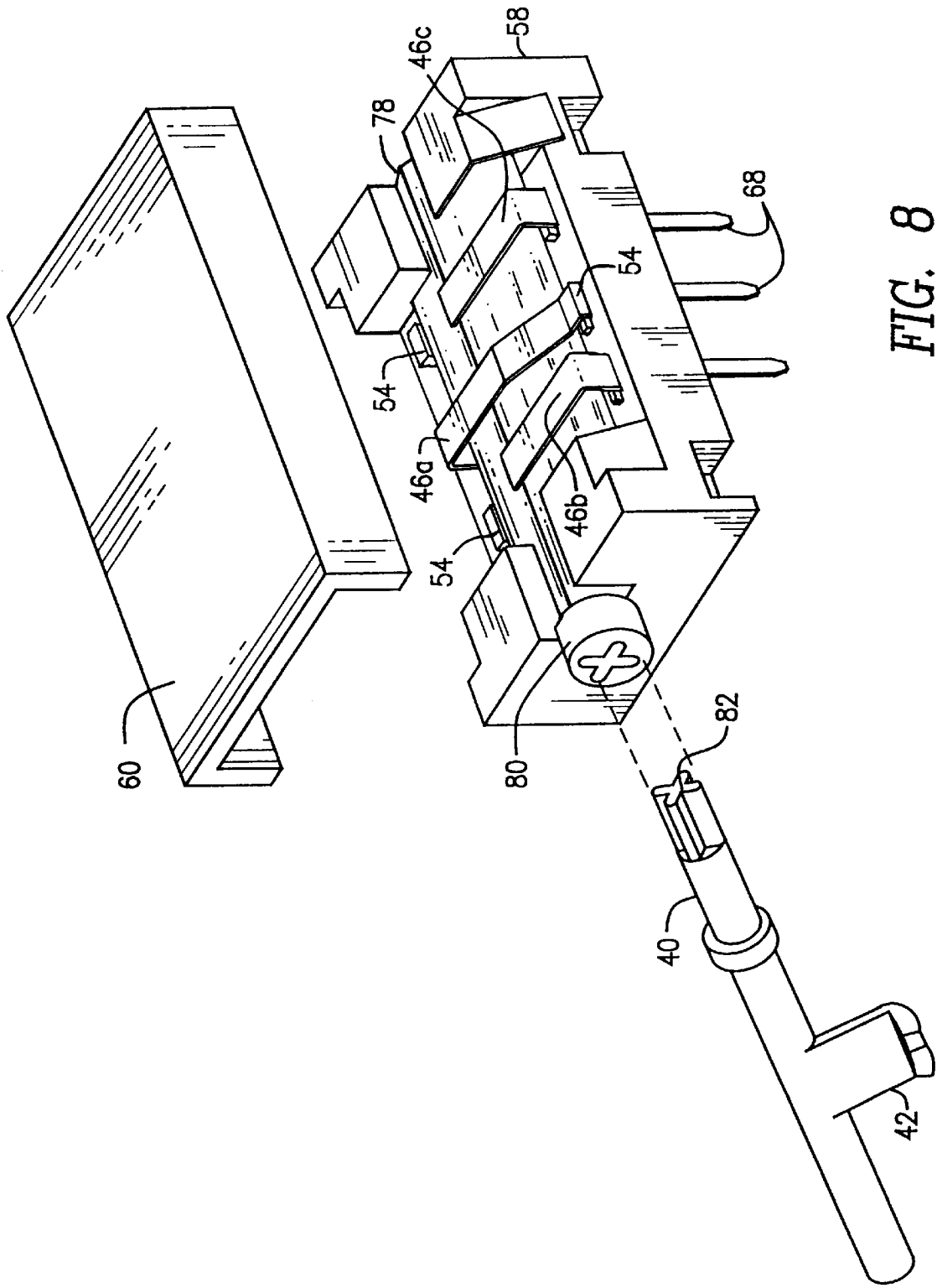
FIG. 8 is a perspective view of the second embodiment of the switch of the present invention.

The present telecommunication module 10 further includes at least one switch, but preferably includes a first switch 32 for the output jack 16 and second switch 34 for the input jack 18, as is best shown in FIGS. 2, 3, 4, and 7. Each switch 32, 34 has a first state and a second state, as will be discussed in greater detail below. As shown in FIGS. 6 and 8, each switch 32, 34 is mounted on the circuit board 50 via a plurality of prongs 68, which are inserted through apertures in the circuit board 50, and soldered thereto. The prongs 68 are coupled to a base 58 of each switch 32, 34, which is shown in FIG. 5. The base 58 is preferably constructed of a non-conductive material such as thermoplastic or nylon and has an elongated channel 48 formed lengthwise therein for receiving, at least partially, a rotatable camshaft 44 therein. The camshaft 44 is constructed of an electrically conductive metal such as steel or aluminum.

As is best shown in FIGS. 3 and 4, separate camshafts 44 are mechanically and electrically coupled to the switches 32, 34 and to separate switch operation shafts 40 that are mechanically and electrically coupled to the switches 32, 34 via the camshafts 44. Each switch operation shaft 40 extends outward from the switches 32, 34 such that each switch operation shaft 40 is adjacent to one of the jacks 16, 18. Angled ramps 42 are coupled to the switch operation shafts 40 and spaced apart from the switches 32, 34. The camshaft 44 is in axial alignment with the switch operation shaft 40 for rotating when the switch operation shaft 40 is rotated to change states of each switch 32, 34. As further shown in FIGS. 2, 3, 4, 6, and 7, a card edge 70 is formed on the circuit board 50 for coupling to a card edge 70 connector. The card edge 70 has electrical contacts on only one side, as shown in FIG. 7, and is formed opposite the jacks 14, 16, 18, 20 on the circuit board 50, and will be discussed in greater detail below.

Figure 10:
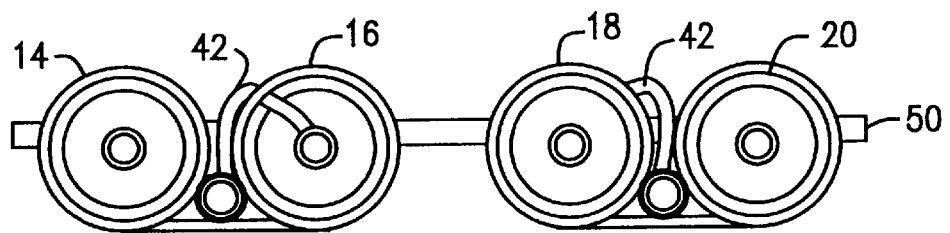
FIG. 10 is a front elevational view of the plurality of jacks of the module of the present invention.

As shown in FIGS. 4 and 10, an opening is disposed in each of the jacks, but preferably two spaced apart openings 66 for receiving the angled ramp 42 therein such that the switch and the associated switch operation shaft 40 can be mounted on either side of the jacks 14, 16, 18, 20 on the circuit board 50. When the plug 22 is inserted into one of the jacks 14, 16, 18, 20 the plug 22 contacts the angled ramp 42 within the jack causing the ramp 42 to be biased out of the jack through one of the openings 66 and thus the switch operation shaft 40 to rotate, thereby changing states of the switch from a normally closed state where an electrical signal does not enter the jack, to a state where it does.

One embodiment of the present switch 32 is best shown in FIG. 5, the switch 32 further includes a plurality of electrically conductive leaf springs 46 mounted to the base 58 and a corresponding and opposing plurality of electrically conductive L-shaped members 54 mounted in slots 52 formed in the base 58. The leaf springs 46 and L-shaped members 54 are preferably constructed of copper for electrical conductivity. A plastic cover 60 snap fits onto the base 58 and covers the L,-shaped members 54, leaf springs 46, camshaft 44, slots 52, and base 58.

The camshaft 44 includes a plurality of extensions 56 for allowing the switch 32 to have a first normally closed state with two of the extensions 56 releasing mechanical contact between two of the plurality of leaf springs 46b and 46c and two of the L-shaped members 54, in axial alignment therewith, when the plug 22 is not installed in the associated jack. This is accomplished by two of the extensions 56 actuated "under" the leaf springs 46b and 46c, thereby lifting the leaf springs 46b and 46c such that they do not contact the L-shaped members 54. Also in this normally closed state, the middle leaf spring 46a contacts one of the L-shaped members 54 that is in axial alignment therewith.

A second embodiment of the present switch 32 is shown in FIG. 8, the switch 32 further includes a plurality of electrically conductive leaf springs 46 mounted to the base 58 and a corresponding and opposing plurality of electrically conductive L-shaped members 54 mounted in slots 52 formed in the base 58. The leaf springs 46 and L-shaped members 54 are preferably constructed of copper for electrical conductivity. Instead of a camshaft, a rocker arm 78 is mounted via friction fit in the base 58 of this embodiment. Integrally coupled to the rocker arm 78 is a coupling cylinder 80 that has a cross-shaped aperture disposed therein for receiving a complimentary cross-shaped coupler attached to the switch operation shaft 40. A plastic cover 60 snap fits onto the base 58 and covers the L-shaped members 54, leaf springs 46, rocker arm 78, and base 58.

At rest, the rocker arm 78 prevents mechanical contact between two of the plurality of leaf springs 46b and 46c and two of the L-shaped members 54, in axial alignment therewith, when the plug 22 is not installed in the associated jack. This is accomplished by the rocker arm 78 being placed "under" the leaf springs 46b and 46c, thereby lifting the leaf springs 46b and 46c such that they do not contact the L-shaped members 54. Also in this normally closed state, the middle leaf spring 46a contacts one of the L-shaped members 54 that is in axial alignment therewith.

As shown in FIG. 7 in the normally closed state for both embodiments of the switches, the telecommunications signal on the cross connect X-OUT line 94 and the cross connect X-IN line 104 on the card edge 70 to be routed to the signal OUT line 96 and signal IN line 102, respectively, when the plug 22 is not inserted into one of the jacks 16, 18. As stated above this provides for a normally closed circuit with the jacks normally open to prevent electrical shock unless the plug 22 is inserted therein and the associated DSX module is inserted into a panel whereby it is energized.

When the plug 22 is partially inserted into one of the jacks, as for example the output jack 16, the camshaft 44 or rocker arm 78 is rotated partially clockwise such that all the leaf springs 46a, 46b, and 46c contact the L-shaped members 54 and thus switches SW1, SW2, and SW3 of switch 32 are closed. Similarly, when the plug 22 is partially inserted into the input jack 18, the camshaft 44 is rotated partially such that switches SW4, SW5, and SW6 out of switch 34 are closed. Thus, this is a "make" before "break" circuit arrangement with the plug 22 contacting the ramp 42 before the closed circuit running through switches SW3 and/or SW6 are broken.

When, however, the plug 22 is fully inserted into, for example, the output jack 16, a co-axial pin 62 of the plug 22 comes in electrical and mechanical communication with a co-axial rod 64 disposed in the output jack 16, as shown in FIG. 4. The co-axial rod 64 preferably has a bore disposed therein for receiving, at least partially, the co-axial pin 62 of the plug 22. At this time of insertion, one of the extensions 56 or rocker arm 78 will lift leaf spring 46a from contacting the L-shaped member 54 in axial alignment therewith. This occurs when the camshaft of switch 32 is rotated clockwise and represents the opening of switch SW3, as shown in FIG. 7, while simultaneously switches SW1 and SW2 become closed. At this time, the signal on the cross connect X-OUT line 94 will be routed across resistor R2, which preferably has a resistance of seventy-five ohms. The signal then continues to a first ground line 98.

Moreover, the signal on the OUT line is routed through switch SW1, because SW3 will be open circuited and the signal is received in the output jack 16. Likewise, when the plug 22 is inserted into the first monitor jack 14, the signal on the OUT line 96 of the card edge 70 is sent across resistor R1, which has a preferred value of seven hundred and sixty-eight ohms. This relatively large resistance value allows approximately five percent of the signal to pass, which can then be monitored via the first monitor jack 14, and results in no degradation in performance of the telecommunications network.

When the plug 22 is fully inserted into the input jack 18, one of the extensions 56 or rocker arm 78 of the second switch 34 will rotate counterclockwise and "lift" a center leaf spring from contacting one of the L-shaped members in axial alignment therewith, which represents the opening of switch SW6, as shown in FIG. 7, while simultaneously switches SW4 and SW5 become closed. At this time, the signal on the cross connect X-IN line 104 will be routed across resistor R4, which preferably has a resistance of seventy-five ohms. The signal then continues to a second ground line 100.

Moreover, the signal on the IN line 102 is routed to the input jack 18. Likewise, when the plug 22 is inserted into the second monitor jack 20, the signal on the IN line 102 of the card edge 70 is sent across resistor R3, which has a preferred value of seven hundred and sixty-eight ohms. This relatively large resistance value only allows approximately five percent of the signal to pass, which can then be monitored via the second monitor jack 20. It is understood that the terms "clockwise" and "counterclockwise" used throughout are meant to be exemplary and could easily be reversed if switches 32 and 34 were reversed such that the switch operation shafts 40 are on opposite sides of the input and output jacks 18 and 16, respectively, than that shown in FIG. 4.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A telecommunication module for receiving a plug and having a circuit board disposed therein with a bounding edge, the telecommunication module comprising:

a jack mounted on the circuit board for receiving the plug therein;

a switch mounted on the circuit board and having at least two states;

a switch operation shaft mechanically and electrically coupled to the switch and extending outward therefrom such that the switch operation shaft is adjacent to the jack; and wherein when the plug is inserted into the jack, the switch operation shaft is actuated thereby changing states of the switch.

2. The telecommunication module of claim 1 further comprising an angled ramp coupled to the switch operation shaft and spaced apart from the switch.

3. The telecommunication module of claim 2 wherein the jack further includes an opening for receiving the angled ramp therein.

4. The telecommunication module of claim 3 wherein when the plug is inserted into the jack, the plug contacts the angled ramp within the jack causing the switch operation shaft to rotate thereby changing states of the switch as the angled ramp is biased from within the jack.

5. The telecommunication module of claim 1 further comprising a camshaft coupled to the switch operation shaft and in axial alignment therewith for rotating when the switch operation shaft is rotated to change states of the switch.

6. The telecommunication module of claim 1 wherein the switch operation shaft is rotated when actuated.

7. The telecommunication module of claim 2 wherein the jack has two spaced apart openings for receiving the angled ramp therein such that the switch and the associated switch operation shaft can be mounted on either side of the jack on the circuit board.

8. The telecommunication module of claim 5 wherein the switch further includes a plurality of leaf springs mounted thereon and a corresponding plurality of L-shaped members in axial alignment therewith against which the plurality of plurality of leaf springs are naturally biased.

9. The telecommunication module of claim 8 wherein the camshaft includes a plurality of extensions that when rotated prevents mechanical and electrical connection from being made between at least one of the plurality of L-shaped members and at least one of the plurality of leaf springs thereby changing states of the switch.

10. The telecommunication module of claim 1 wherein the switch further includes a plurality of leaf springs mounted thereon and a corresponding plurality of L-shaped members against which the plurality of plurality of leaf springs are naturally biased.

11. The telecommunication module of claim 10 wherein the switch further includes a rocker arm that when rotated prevents mechanical and electrical connection from being made between at least one of the plurality of L-shaped members and at least one of the plurality of leaf springs thereby changing states of the switch.

12. The telecommunication module of claim 11 wherein the rocker arm includes a coupling cylinder disposed thereon for partially receiving the switch operation shaft therein.

13. A telecommunication jack for mounting on a circuit board having a bounding edge, two sides, and a plurality of landing pads and a plurality of grounding pads attached thereto, the jack comprising:

a pad abutting the bounding edge of the circuit board;

a leg coupled to the jack and extending outward therefrom;

a dielectric secured in the pad;

a rod partially projecting outside the jack and surrounded by the dielectric, the rod being in electrical and mechanical communication with one of the plurality of landing pads of the circuit board; and attachment means for securing the jack to the circuit board.

14. The telecommunication jack of claim 13 wherein the leg of the switch is in electrical and mechanical communication with one of the plurality of grounding pads of the circuit board.

15. The telecommunication jack of claim 13 wherein the switch further includes a plurality of paired legs, each of the paired legs abutting the two sides of the circuit board.

16. The telecommunication jack of claim 15 wherein each of the paired legs hold the jack in place via friction fit.

17. The telecommunication jack of claim 13 wherein the rod is in mechanical communication with one of the plurality of landing pads of the circuit board on only one of the two sides of the circuit board.

18. The telecommunication jack of claim 13 wherein the rod is in mechanical communication with one of the plurality of landing pads of the circuit board via friction fit.

19. A telecommunication module for receiving a plug and having a circuit board disposed therein with a bounding edge, the telecommunication module comprising:

a jack mounted on the edge of the circuit board for receiving the plug therein;

a switch mounted on the circuit board;

a plurality of leaf springs mounted on the switch;

a plurality of L-shaped members mounted on the switch against which the plurality of leaf springs are naturally biased;

a rocker arm mounted in the switch when rotated prevents mechanical and electrical connection from being made between at least one of the plurality of L-shaped members and at least one of the plurality of leaf springs thereby changing states of the switch;

a switch operation shaft mechanically and electrically coupled to the switch and extending outward therefrom such that the switch operation shaft is adjacent to the jack; and wherein when the plug is inserted into the jack, the switch operation shaft is actuated thereby changing states of the switch.

20. The telecommunication module of claim 19 further comprising an angled ramp coupled to the switch operation shaft and spaced apart from the switch.

21. The telecommunication module of claim 20 wherein the jack further includes an opening for receiving the angled ramp therein.

22. The telecommunication module of claim 21 wherein when the plug is inserted into the jack, the plug contacts the angled ramp within the jack causing the switch operation shaft to rotate thereby changing states of the switch as the angled ramp is biased from within the jack.

23. The telecommunication module of claim 19 further comprising a camshaft coupled to the switch operation shaft and in axial alignment therewith for rotating when the switch operation shaft is rotated to change states of the switch.

24. The telecommunication module of claim 19 wherein the switch operation shaft is rotated when actuated.

25. A telecommunication jack for mounting on a circuit board having a bounding edge, two sides, and a plurality of pads attached thereto for electrical communication, the jack comprising:

a pad abutting the bounding edge of the circuit board;

a dielectric secured in the pad;

a holding structure projecting outside the jack and in electrical and mechanical communication with one of the plurality of pads of the circuit board; and attachment means for securing the jack to the circuit board.

26. The telecommunication jack of claim 25 wherein the holding structure is surrounded by the dielectric.

27. The telecommunication jack of claim 25 wherein the holding structure includes a plurality of paired legs, each of the paired legs abutting the two sides of the circuit board.

28. The telecommunication jack of claim 27 wherein each of the paired legs hold the jack in place via friction fit.

29. The telecommunication jack of claim 25 wherein the holding structure includes a rod surrounded by the dielectric.

30. The telecommunication jack of claim 29 wherein the rod is in mechanical communication with the circuit board on only one of the two sides of the circuit board.

* * * * *